(12) United States Patent
Kodama et al.

(10) Patent No.: US 8,422,135 B2
(45) Date of Patent: Apr. 16, 2013

(54) OPTICAL SHEET

(75) Inventors: Takashi Kodama, Tokyo (JP); Gen Furui, Tokyo (JP); Makoto Honda, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 367 days.

(21) Appl. No.: 12/811,134

(22) PCT Filed: Oct. 19, 2009

(86) PCT No.: PCT/JP2009/067991
§ 371 (c)(1),
(2), (4) Date: Jun. 29, 2010

(87) PCT Pub. No.: WO2010/047300
PCT Pub. Date: Apr. 29, 2010

(65) Prior Publication Data
US 2010/0284071 A1    Nov. 11, 2010

(30) Foreign Application Priority Data

Oct. 21, 2008    (JP) ................................. 2008-271218
Jun. 26, 2009    (JP) ................................. 2009-151680

(51) Int. Cl.
*G02B 5/02*    (2006.01)

(52) U.S. Cl.
USPC ............................................ 359/599; 349/96

(58) Field of Classification Search ................... 359/599
See application file for complete search history.

(56) References Cited

U.S. PATENT DOCUMENTS

| | | | |
|---|---|---|---|
| 2006/0152801 A1* | 7/2006 | Matsunaga | ................... 359/443 |
| 2007/0058250 A1 | 3/2007 | Muramatsu | |
| 2007/0139781 A1 | 6/2007 | Inoue et al. | |

FOREIGN PATENT DOCUMENTS

| | | |
|---|---|---|
| JP | 2002-267818 | 9/2002 |
| JP | 2004-191952 | 7/2004 |
| JP | 2004-191956 | 7/2004 |
| JP | 2004-279491 | 10/2004 |
| JP | 2006-81089 | 3/2006 |
| JP | 2006-189658 | 7/2006 |
| JP | 2007-17626 | 1/2007 |
| JP | 2007-108725 | 4/2007 |
| JP | 2007-188070 | 7/2007 |
| JP | 2007-256844 | 10/2007 |
| JP | 2007-264113 | 10/2007 |
| JP | 2007-334294 | 12/2007 |
| WO | 2008/020578 | 2/2008 |

OTHER PUBLICATIONS

International Search Report issued Mar. 2, 2010 in International (PCT) Application No. PCT/JP2009/067991.
International Preliminary Report on Patentability issued May 17, 2011 in International (PCT) Application No. PCT/JP2009/067991.

* cited by examiner

*Primary Examiner* — James Jones
(74) *Attorney, Agent, or Firm* — Wenderoth, Lind & Ponack, L.L.P.

(57) ABSTRACT

An optical sheet for use as a display device surface, has a functional layer on at least one side of a transparent base material and has a diffusion factor on the outer surface and/or interior of the functional layer, wherein the relationship represented by the following formula (I) is satisfied.

$$0.16 < R/V < 0.71 \tag{I}$$

R (diffuse regular reflection intensity): Intensity in the direction of the diffuse regular reflection
V: Sum of the diffuse reflection intensities measured for each degree between $-\theta$ degrees and $+\theta$ degrees with respect to the direction of diffuse regular reflection when the optical sheet is irradiated with visible light rays.

13 Claims, 6 Drawing Sheets

←Diffusion angle→

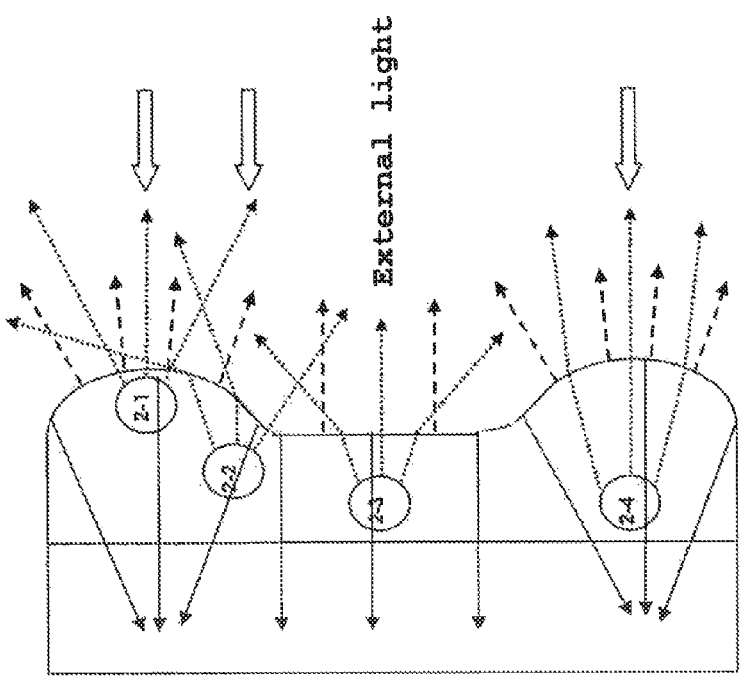
Fig. 9-2
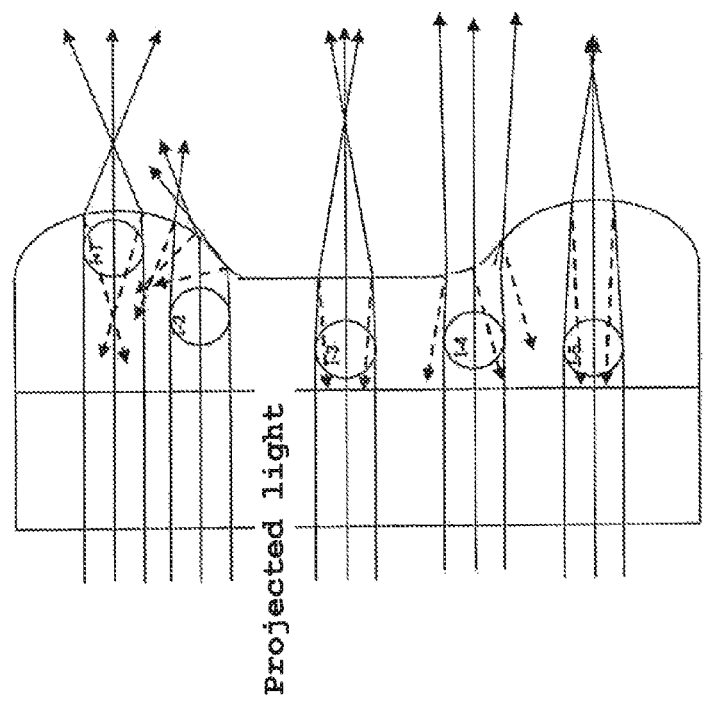
Fig. 9-1
Fig. 9

Fig. 10
Fig. 10-1
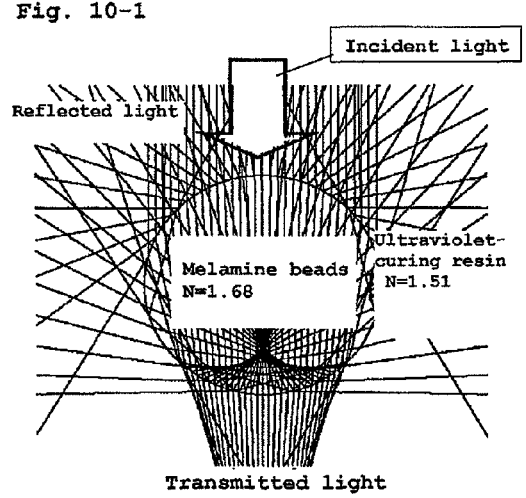
Fig. 10-2
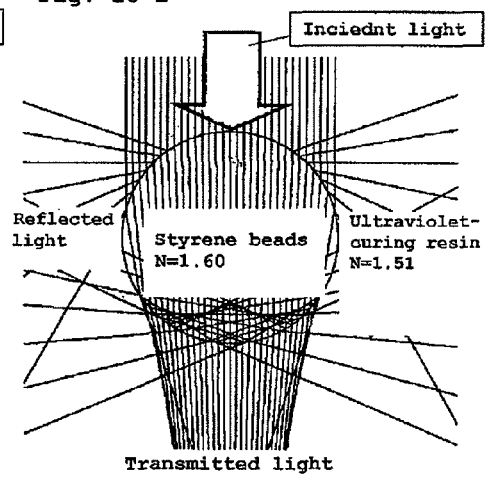
Fig. 10-3
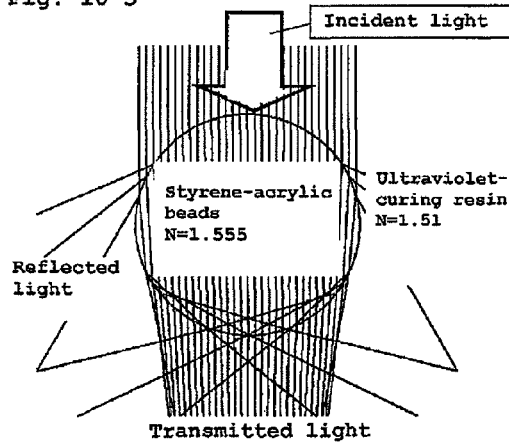
Fig. 10-4
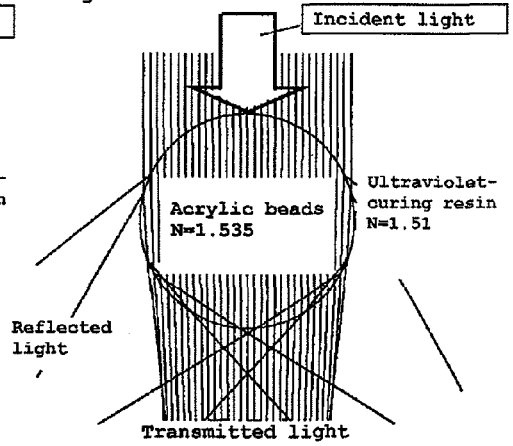

OPTICAL SHEET

BACKGROUND OF THE INVENTION

I. Technical Field

The present invention relates to an optical sheet with excellent vivid complexion and blackness and excellent image crispness, that is suitable for combination of dynamic images and still images.

II. Description of the Related Art

Optical sheets used for display device surfaces have layers with functions such as an anti-glare property, antistatic property and antifouling property laminated as functional layers on the observer side of a transparent base material. To exhibit these functions, in order to impart an anti-glare property, for example, methods of forming a concavoconvex shape in the surface layer or adding diffusion particles to the resin forming the surface layer are employed.

Conductive fine particles or a conductive resin may be added to impart an antistatic property, or a fluorine-containing polymer or stain-proofing agent may be added in order to impart an antifouling property. Since such diffusion particles, conductive fine particles and additives are not completely compatible with surface layer-forming resins, an optical sheet that employs them has a function of diffusing visible light. The concavoconvex sections of the surface layer also have the function of diffusing visible light.

Also, concavoconvexities larger than the visible light wavelength are formed in the surface layer, the transparent base material back side and between each layer in order to prevent interference patterns between optical sheets and interference patterns between optical sheets and display devices, and such concavoconvexities also have the function of diffusing visible light.

According to the invention, such causes of visible light diffusion are defined as "diffusion factors", and the presence of such diffusion factors causes the optical sheet to have reduced contrast due to reflection of external light. In other words, an optical sheet should maintain the function of the optical sheet while preventing loss of contrast.

The haze value or the ratio of the interior haze and total haze, is commonly used as a simple method for evaluating contrast. Specifically, it has been considered that an optical sheet with low contrast reduction can be produced by specifying the materials and controlling the production conditions in the optical sheet production process for a lower haze value (see Japanese Unexamined Patent Publication No. 2002-267818, Japanese Unexamined Patent Publication No. 2007-334294 and Japanese Unexamined Patent Publication No. 2007-17626).

However, contrast often differs even with the same haze value, and it has been found that, even with production using the haze value and the ratio of the interior haze and total haze as indexes, for example, it is not always possible to stably produce a satisfactory optical sheet.

In recent years, with the widening use of delivery systems including 1seg, it has become increasingly possible to view both still images and dynamic images on the same display. The image quality demanded for display terminals has therefore undergone a change, leading to demand for optical sheets with excellent suitability for combinations of still images and dynamic images.

Referring to Japanese Unexamined Patent Publication No. 2006-81089 and Japanese Unexamined Patent Publication No. 2006-189658 as examples, the performance required for still images and dynamic images differs, while the observer's viewing condition also differs. As a result of diligent research on performance demanded of optical sheets for dynamic images and still images, the present inventors have found that motion graphics with high contrast and increased picture gloss and brightness are desired as picture quality suitable for viewing dynamic images.

The performance that includes motion and contrast, that are required for dynamic images (for example, brilliant black for black display, or "vivid" brilliance for flesh color display) will be referred to as "vivid complexion and blackness".

Still images must have excellent contrast and prevention of unwanted reflection, and such performance of contrast and prevention of unwanted reflection required for still images will be referred to as "image crispness". In other words, optical sheets with excellent vivid complexion and blackness and image crispness are desired.

[Patent document 1] Japanese Unexamined Patent Publication No. 2002-267818
[Patent document 2] Japanese Unexamined Patent Publication No. 2007-334294
[Patent document 3] Japanese Unexamined Patent Publication No. 2007-17626
[Patent document 4] Japanese Unexamined Patent Publication No. 2006-81089
[Patent document 5] Japanese Unexamined Patent Publication No. 2006-189658

SUMMARY OF THE INVENTION

In light of these circumstances, it is an object of the present invention to provide an optical sheet with excellent vivid complexion and blackness and image crispness, that is suitable for combination of dynamic images and still images.

Contrast and anti-glare properties have hitherto been considered to depend on surface form which includes the Ra, Rz, Sm and θa values for surface irregularities, or have been considered to depend on the state of reflection of external light that is based on the difference in refractive index between the interior dispersing agent and binder resin, or interior diffusion particles. In other words, the effect of interaction between surface irregularities and internal diffusion factors has not been considered.

The present inventors have found that the diffusion properties for projected light incident to diffusion particles, and for external light passing through and light reflected by the diffusion particles, differs significantly depending on the difference in refractive index between the interior diffusion particles and binder resin, as indicated by 1 to 4 in FIG. 10, and that a larger difference in refractive index between the diffusion particles and binder increases the reflective light quantity by the diffusion particles and increases the diffusion angle, thus increasing the stray light quantity from projected light and the reflected light quantity from external light and lowering the contrast, and have further found that the transmission and reflectance properties for projected light passing through the diffusion particles, and the state of stray light generation which impairs resolution and contrast, differ significantly depending on the positional relationship between the diffusion particles and surface irregularities, as indicated by 1-1 to 1-5 in FIG. 9-1, and that for external light as well, the reflectance properties for light reflection by the diffusion particles from external light incident to the diffusion layer interior and the state of stray light generation which impairs contrast, differ significantly depending on the positional relationship between the diffusion particles and surface irregularities, as indicated by 2-1 to 2-4 in FIG. 9-2, so that by combining the surface irregularities, the diffusion particle properties and the relationship between surface irregularities and interior diffusion particles according to the optical sheet of the present application, it is possible to obtain an optical sheet with not only excellent contrast and anti-glare properties but also excellent vivid complexion and blackness and image crispness.

Furthermore, when the positional relationship between the surface irregularities and diffusion particles is such that the diffusion of external light reflected by the diffusion particles is large, as shown by the diffusion particles 2-2 in FIG. 9-2, the diffusion of projected light is also large tending to produce stray light, as indicated by 1-2 in FIG. 9-1, thus also tending to result in contrast reduction due to the projected light. That is, the magnitude relationship for contrast reduction by stray light from projected light can be considered to approximate the reflectance properties for external light. The same applies for vivid complexion and blackness due to stray light.

The present inventors have found that, in order to obtain dynamic images with excellent vivid complexion and blackness, it is satisfactory for the optical sheet to have low transmission diffusion, high regular transmission intensity and high directivity of projected light, and to minimally reduce the stray light component of external light and projected light. On the other hand, high transmission scattering generates stray light and lowers the directivity of projected light and causes images to appear straw-colored, such that vivid brilliance for display of flesh colors is not obtained.

To obtain still images with excellent image crispness, however, it is necessary to achieve both contrast and prevention of unwanted reflection.

However, when the anti-glare property is increased to improve prevention of unwanted reflection, the reflection diffusion increases, contrast is reduced and image crispness is impaired.

As a result of much diligent research on image crispness, the present inventors have found that a virtual image becomes a problem for an observer because the focus of the observer when viewing an image repeatedly meets at the unwanted reflected external image, and the focus fails to settle on the original image.

As a result of further research, it was found that if the borders of the unwanted reflected external image are rendered indistinct, the virtual image is no longer a problem and contrast reduction can also be minimized, while resulting in improved image crispness.

In other words, in order to achieve both image crispness required for still images and vivid complexion and blackness for dynamic images, it was found that it is important to minimize the reduction in the regular transmission intensity component of regular transmission diffusion, and appropriately ensure low reflection diffusion that renders the borders of unwanted reflected external images indistinct, while also reducing the stray light component.

This means that the regular reflection intensity component is converted to diffusion near the regular reflection, and considering (a)-(c) below, it means that an optical sheet can be obtained that exhibits both still image crispness and dynamic image vivid complexion and blackness. That is, it satisfies the three factors of: (a) low transmission diffusion (high regular transmission intensity component), (b) a small regular reflection intensity component, and (c) conversion to diffusion near the regular reflection.

An optical sheet usually includes added conductive particles to impart an antistatic function or added fine particles to prevent glare or form surface irregularities, and it has internal diffusion other than the diffusion by the surface irregularities (hereunder referred to as "external diffusion").

When the diffusion by the internal diffusion factor and the diffusion due to the surface form are compared, the ratio of the refractive indexes of the resin composing the optical sheet and the internal diffusion factor is much smaller than the ratio of the refractive indexes of air on the external surface and of the resin, and therefore in an optical sheet having concavoconvexities on the surface, the transmission diffusion intensity depends dominantly on the surface form.

Also, if $\psi$ is the emergence angle from the slanted surface at $\theta$ and n is the refractive index of the coating film, then $n*\sin \theta = \sin \psi$ based on Snell's law, and the emergence angle $\psi$ is $A \cdot \sin(n*\sin \theta) - \theta$. Reflection, on the other hand, represents twice the change in the slanted surface at $\theta$, based on the law of reflection, and therefore the angle of reflection $\theta$ is $2*\theta$.

The diffusion angles of reflection and transmission with respect to the surface inclination angle are shown in FIG. 1, for the range of optical sheet surface forms (within 10 degrees) with 1.5 as an ordinary coating film refractive index. As shown in FIG. 1, the diffusion angles for reflection and transmission with respect to the surface inclination angle are proportional, and the diffusion angle due to reflection is always about 30% larger than the diffusion angle due to transmission. That is, low transmission diffusion is essentially synonymous with low reflection diffusion.

Therefore, since the low (a) transmission diffusion can be restated as low (a') reflection diffusion, an optical sheet designed for both the aforementioned prevention of unwanted reflection of still images and vivid complexion and blackness of dynamic images preferably has the regular reflection converted to diffusion near regular reflection.

On the other hand, since low diffusion is preferred for vivid complexion and blackness, it is essential for the conversion to near regular reflection to not be excessive, and the reflection diffusion intensity is preferably controlled to within a specified range.

Incidentally, since the haze value hitherto used in optical sheets is the ratio of light that has been diffused at least 2.5 degrees from regular transmission with respect to the total light rays, as indicated by JIS K7136, it is not possible, based on the haze value, to imagine the use of the aforementioned diffusion near regular reflection, and especially diffusion of less than 2.5 degrees.

The diffusion intensity near regular reflection in the case of isotropic diffusion was therefore considered.

As shown in FIG. 2, in regard to the diffusion intensity, when a layer with diffuse reflection intensity distribution b is laminated on a transparent base with diffuse reflection intensity distribution a, the reduction rate of the diffuse reflection intensity is larger closer to 0 degrees, and therefore the reduction is greater with intensity closer to 0 degrees, and the optical sheet has a diffuse reflection intensity distribution of c.

That is, when the total reflected light quantity is constant, an optical sheet with a larger change in reflective intensity distribution near 0 degrees exhibits a smaller value for the sum (V) of the reflection intensity measured for each degree, while a sheet with a smaller change in the reflective intensity distribution near 0 degrees has a larger V. Also, an optical sheet with a wider reflective intensity distribution from the initial range exhibits a smaller V, while an optical sheet with a narrower reflective intensity distribution from the initial range exhibits a larger V.

In more detail, referring to FIG. 4 which shows the relationship between reflection diffusion angle and intensity, if the total reflected light quantities of optical sheets with reflection diffusion properties of aa, bb and cc have equal integrated reflectances, then Vaa=Vbb=Vcc where Vaa, Vbb and Vcc are the volumes of the respective bodies of rotation around the y-axis as the center.

The following explanation concerns the case where the regular reflection intensity of an optical sheet having the diffusion property aa falls by Oh, to the diffusion properties bb and cc. In the case of bb, the volume Vbaa of the body of rotation at the section represented by the diagonal indicated by bb decreases, and in the section with greater diffusion than the diffusion angle b, the property is bb which is of greater intensity than aa. Since Vaa=Vbb, Vbaa becomes distributed in the volume Vhbb of a donut-shaped body of rotation.

Similarly, in the case of cc, the volume Vcaa of the body of rotation at the section represented by the diagonal indicated by cc decreases, and in the section with greater diffusion than the diffusion angle c, the property is cc which is of greater intensity than aa. Since Vaa=Vcc, Vcaa becomes distributed in the volume Vhcc of a donut-shaped body of rotation.

Also, since the light quantity is presumably proportional to the product of the square of the diffusion angle and the intensity at that diffusion angle, the change in the reflection diffusion property with reduced regular reflection intensity is such that the intensity is lower at that angle further toward the section with high diffusion.

That is, the sum V of the reflection intensity is related to all of the reflection diffusion angles, including not only the antiglare property which is greatly affected near the regular reflection, and the opaqueness which is greatly affected by the section with the large diffusion angle, but also the stray light which cannot be ignored even at the intermediate angles between them.

Thus, R/V represents the degree of change of regular reflection to diffusion near regular reflection, as well as incorporating the influence of stray light, allowing more precise evaluation of the vivid complexion and blackness and crispness. In other words, since in terms of the surface form (external diffusion factor), R/V is approximately the ratio between the flat section which provides regular reflection and the concavoconvex section which provides reflection diffusion, it is related to the concavoconvex slope angle and the percentage of concavoconvexities, while in terms of internal diffusion it is related to the difference in refractive indexes of the diffusion particles and binder and the probability of collision of diffusion particles and the shape, and in terms of interaction between the surface form and internal diffusion it is related to how much further the interaction is weakened or strengthened, so that it determines the vivid complexion and blackness and quality of sharpness.

The present invention has been completed based on the knowledge described above, and it encompasses the following modes.

(1) An optical sheet for use as a display device surface, which has a functional layer on at least one side of a transparent base material and has a diffusion factor on the outer surface and/or interior of the functional layer, wherein the relationship represented by the following formula (I) is satisfied.

$$0.16 < R/V < 0.71 \quad (I)$$

R (diffuse regular reflection intensity): Intensity in the direction of the diffuse regular reflection V: Sum of the diffuse reflection intensities measured for each degree between −θ degrees and +θ degrees with respect to the direction of diffuse regular reflection when the optical sheet is irradiated with visible light rays.

(2) An optical sheet according to (1) above, wherein the following formula (II) is satisfied.

$$0.20 < R/V < 0.62 \quad (II)$$

(3) An optical sheet according to (1) above, wherein the following formula (III) is satisfied.

$$0.31 < R/V < 0.62 \quad (III)$$

(4) An optical sheet according to any one of (1) to (3) above, wherein the display device is a liquid crystal display unit.

(5) An optical sheet according to any one of (1) to (4) above, wherein the functional layer comprises translucent inorganic particles and/or translucent organic particles dispersed in a transparent resin.

(6) An optical sheet according to any one of (1) to (5) above, wherein the functional layer is a transparent resin, and the transparent resin is composed of a plurality of phase separable resins.

(7) An optical sheet according to (5) or (6) above, wherein the refractive indexes of the transparent resin and the translucent inorganic particles and/or translucent organic particles differ.

(8) An optical sheet according to any one of (5) to (7) above, wherein concavoconvexities are provided in the surface of the functional layer by the translucent inorganic particles and/or translucent organic particles.

(9) An optical sheet according to any one of (5) to (8) above, wherein the difference in the refractive indexes of the transparent resin and the translucent inorganic particles and/or translucent organic particles is 0.01-0.25.

(10) An optical sheet according to any one of (5) to (9) above, wherein the mean particle size of the translucent inorganic particles and/or translucent organic particles is 0.5-20 μm.

(11) An optical sheet according to any one of (5) to (10) above, wherein $(d75-d25)/MV$ is no greater than 0.25, where MV is the mean diameter based on the weight average of the translucent inorganic particles and/or translucent organic particles, d25 is the cumulative 25% diameter and d75 is the cumulative 75% diameter.

(12) An optical sheet according to any one of (5) to (11) above, wherein the translucent inorganic particles and/or translucent organic particles are present at 1-30 wt % in the transparent resin.

(13) An optical sheet according to any one of (1) to (12) above, wherein the concavoconvexities formed in a die surface are transferred by inversion to form concavoconvexities in the surface of the functional layer.

(14) An optical sheet according to any one of (5) to (11) above, wherein the transparent resin is an ionizing radiation curable resin, and the functional layer is formed by coating an ionizing radiation curable resin composition containing the ionizing radiation curable resin onto a transparent base material and subjecting it to crosslinking curing.

(15) An optical sheet according to (14) above, wherein the transparent base material is a cellulose-based resin, the ionizing radiation curable resin composition comprises a solvent that is impregnated into the transparent base material and/or an ionizing radiation curable resin that is impregnated into the transparent base material and a solvent that is not impregnated into the transparent base material and/or an ionizing radiation curable resin that is not impregnated into the transparent base material, and which is controlled so that the relationship of formula (I), formula (II) or formula (III) is satisfied.

(16) An optical sheet according to any one of (1) to (15) above, wherein the transparent base material is triacetyl-cellulose or a cyclic olefin.

(17) An optical sheet according to any one of (1) to (15) above, wherein the transparent base material is polyethylene terephthalate.

(18) An optical sheet according to any one of (1) to (17) above, wherein the functional layer comprises a hard coat layer, and the steel wool scuff resistance is at least 200 g/cm².

(19) An optical sheet according to any one of (1) to (18) above, which has an anti-reflection functional layer formed on the uppermost surface layer.

(20) A polarizing plate employing an optical sheet according to any one of (1) to (19) above.

(21) An image display device employing a polarizing plate according to (20) above.

(22) A method for producing an optical sheet for use as a display device surface, which has a functional layer on at least one side of a transparent base material and has a diffusion factor on the outer surface and/or interior of the functional layer, wherein the production conditions are controlled so that the relationships of formula (I) to formula (III) are satisfied.

According to the invention it is possible to provide an optical sheet with excellent vivid complexion and blackness and image crispness, where evaluation of the vivid complexion and blackness and image crispness which could not be evaluated by the conventional haze value, as seen in the graphs showing the relationship between vivid complexion and blackness and image crispness and total haze (FIG. 5), interior haze (FIG. 6) and interior haze/total haze (FIG. 7), is accomplished conveniently as seen in FIG. 8 which shows the relationship between the vivid complexion and blackness and image crispness and R/V.

BRIEF DESCRIPTION OF THE DRAWINGS

FIG. 9 is a set of diagrams illustrating the properties of reflected light based on the positional relationship of diffusion particles and surface irregularities for projected light and external light.

FIG. 10 is a set of diagrams illustrating differences in diffusion properties of light based on the difference in refractive indexes of interior diffusion particles and binder resin.

DETAILED DESCRIPTION OF THE INVENTION

The optical sheet of the invention is an optical sheet having a functional layer on at least one side of a transparent base material and having a diffusion factor on the outer surface and/or interior of the functional layer, wherein the conditions are controlled so that the relationship 0.16<R/V<0.71 is satisfied.

The method of measuring R and V will now be explained with reference to FIG. 3.

Figure 1:
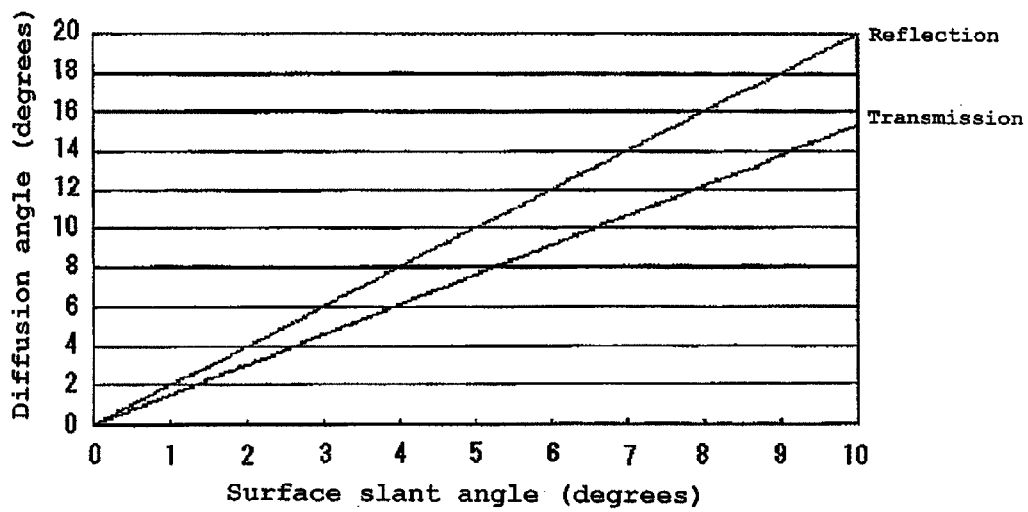
FIG. 1 is a graph showing the diffusion angles of reflection and transmission with respect to surface inclination angle.
Figure 2:
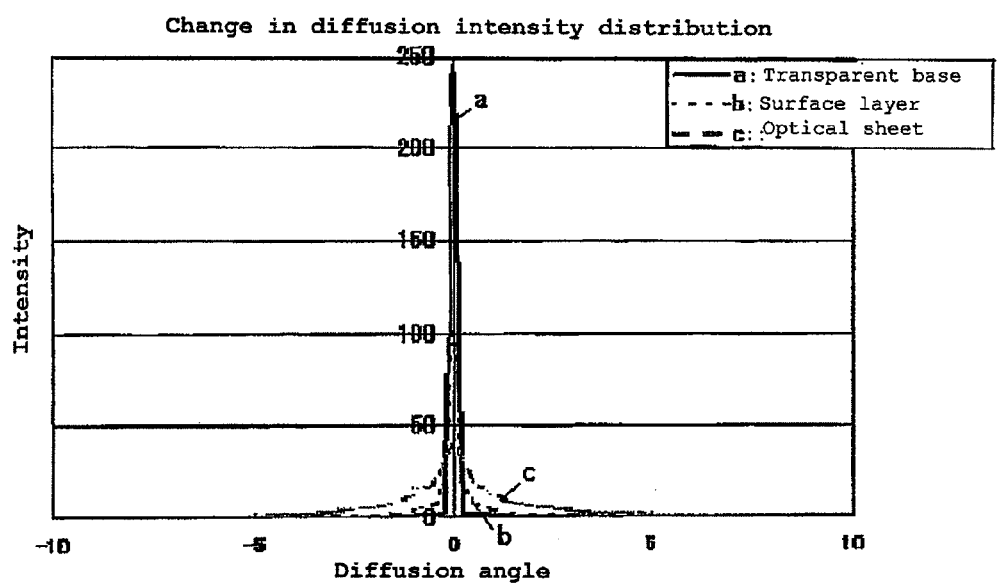
FIG. 2 is a graph showing diffusion intensity distribution.
Figure 3:
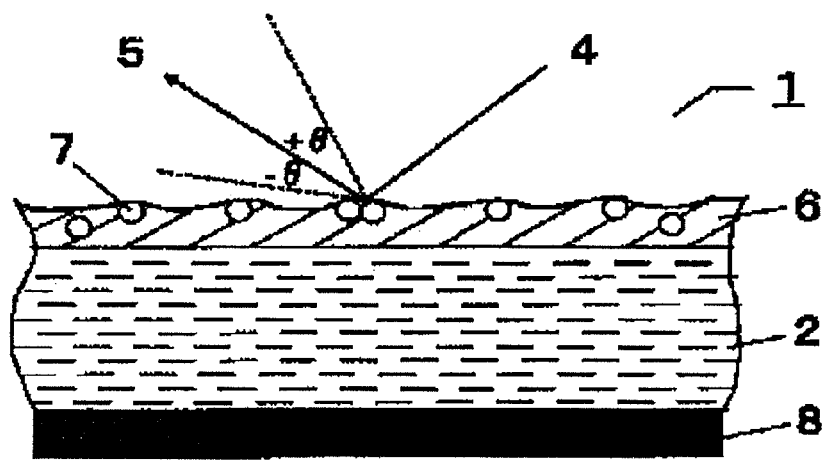
FIG. 3 is a conceptual drawing showing the method of measuring diffuse reflection intensity according to the invention.
Figure 4:
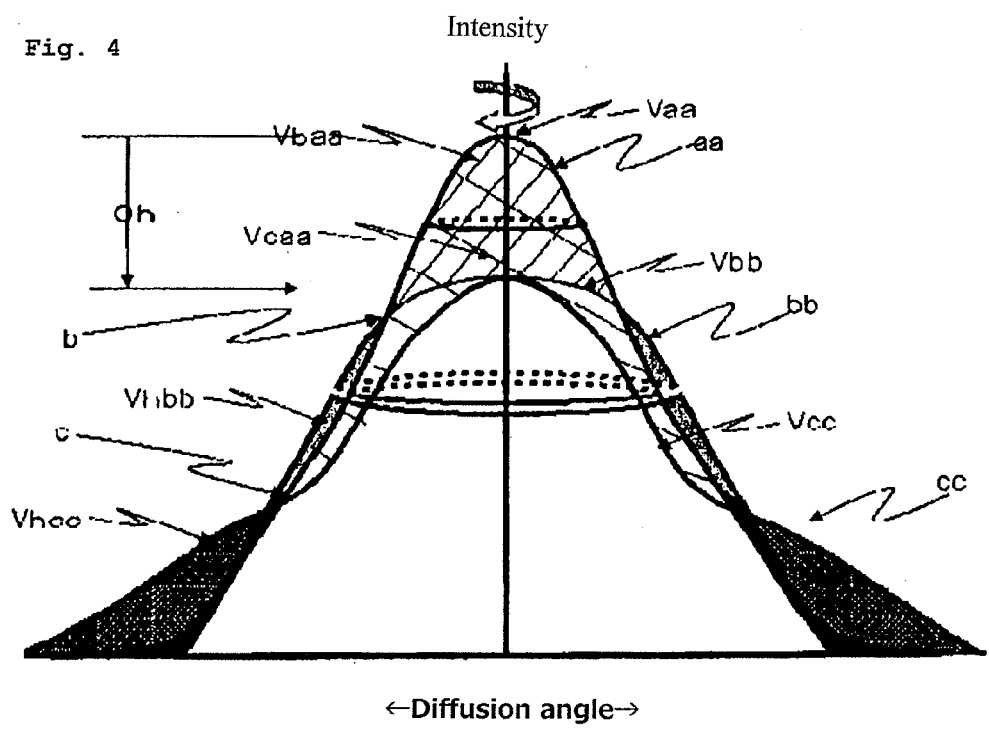
FIG. 4 is a conceptual drawing for detailed illustration of diffusion intensity distribution.
Figure 5:
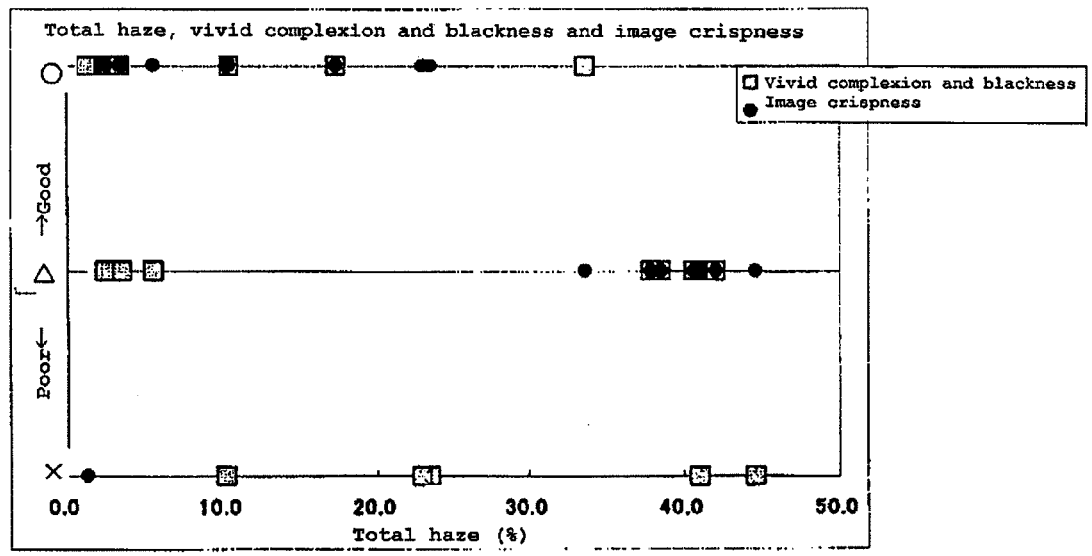
FIG. 5 is a graph showing total haze, vivid complexion and blackness and image crispness.
Figure 6:
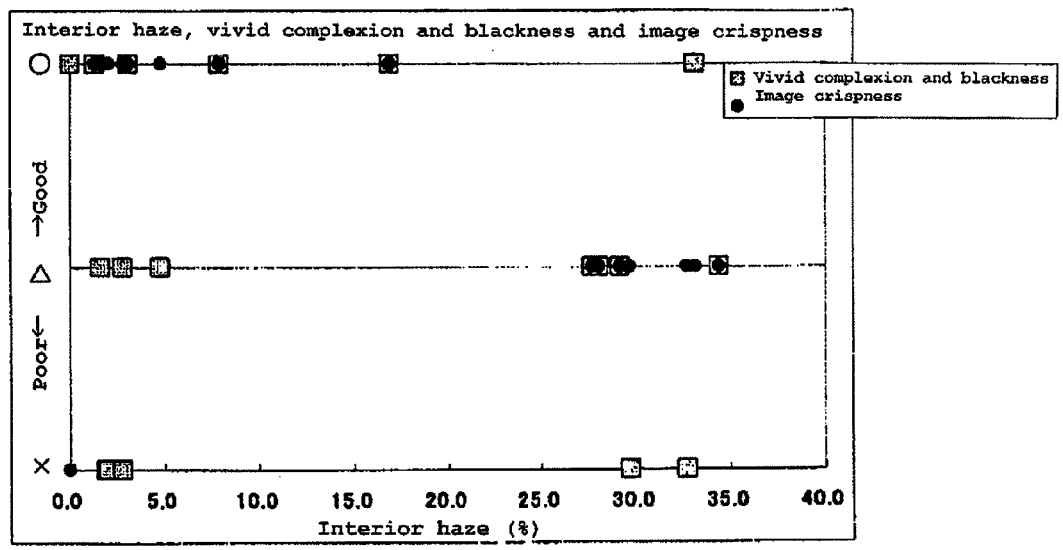
FIG. 6 is a graph showing interior haze, vivid complexion and blackness and image crispness.
Figure 7:
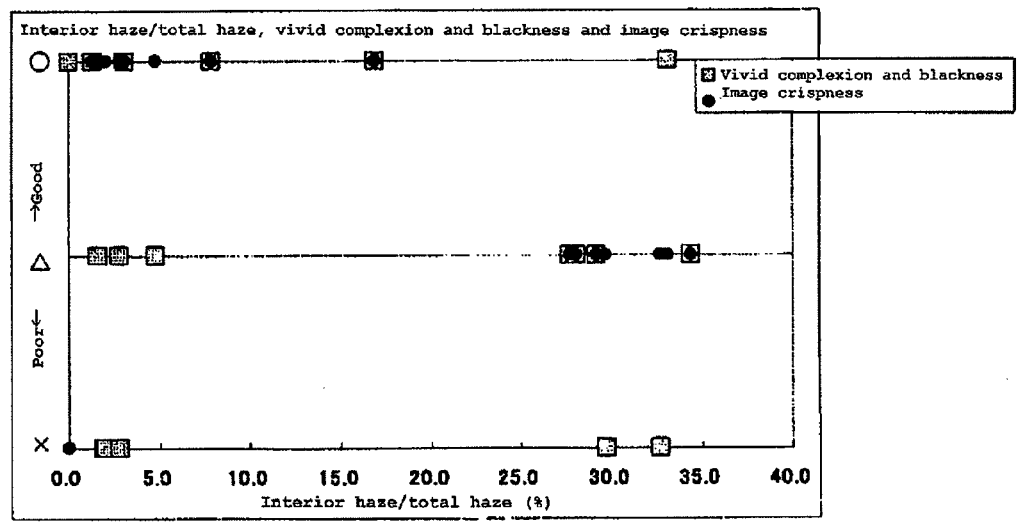
FIG. 7 is a graph showing the ratio between interior haze and total haze, vivid complexion and blackness and image crispness.
Figure 8:
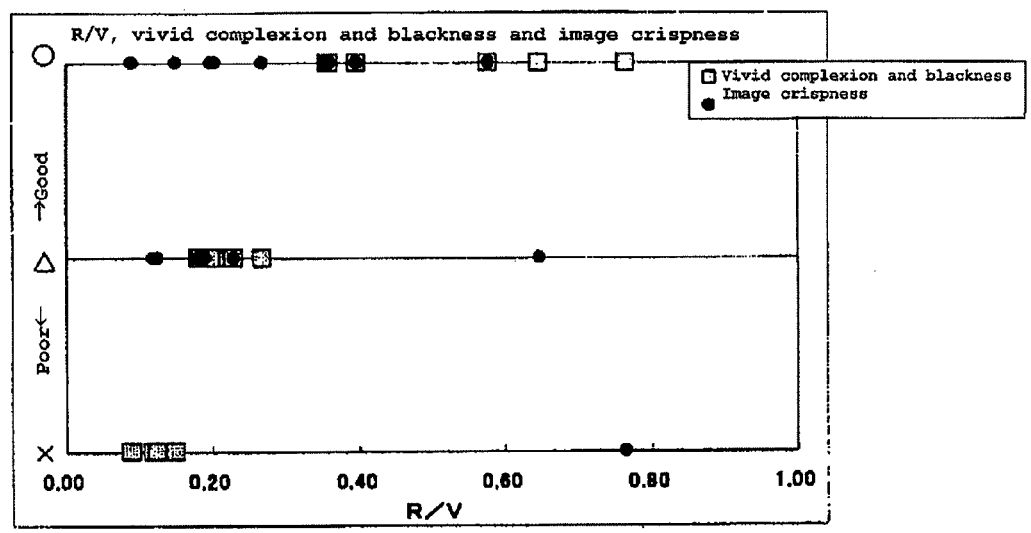
FIG. 8 is a graph showing R/V, vivid complexion and blackness and image crispness.

When visible light rays are irradiated from direction 4 onto the optical sheet 1 as shown in FIG. 3, diffuse regular reflection occurs in direction 5, while part of the light is diffused. The direction of 5 is the diffuse regular reflection direction, and the intensity of light in the diffuse regular reflection direction is defined as the diffuse regular reflection intensity R.

As explained below, a visible light-absorbing material 8 such as a black acrylic board is attached to the back side of the transparent base material 2 via an adhesive, in order to suppress back side reflection to match conditions of practical use.

The sum of the diffuse reflection intensity measured for each degree between $-\theta$ degrees and $+\theta$ degrees with respect to the diffuse regular reflection direction, as shown in FIG. 3, is V. The measurement precision for the angle $\theta$ which determines the measurement range is higher with a larger angle range, and sufficient measurement precision can usually be obtained at about 45 degrees. By varying the incident beam angle, it is possible to vary the maximum measurement range for $\theta$.

In addition, during the optical sheet manufacturing process, the material selection and production conditions are controlled using R/V as the index, to obtain an optical sheet satisfying formula (I) above.

Specifically, the diffuse reflection intensity is measured in the following manner.

(Method of Measuring Diffuse Reflection Intensity)

The back side of an optical sheet (the side without the surface layer, or the side opposite the observer side) is attached via a transparent pressure-sensitive adhesive to a flat black acrylic board without concavoconvexities or warping, to fabricate an evaluation sample.

The black acrylic board used here is to prevent back side reflection as described above, and it is not particularly restricted so long as no air spaces are present on the back side of the optical sheet, and visible light can be absorbed.

When measurement is in the manufacturing line, for example, it is possible to perform online measurement by a method such as coating a black paint onto the back side of the examining section of the optical sheet.

Next, the evaluation sample is set in a measuring apparatus and a light beam is directed at an angle 45 degrees from the normal to the surface of the optical sheet side of the evaluation sample. The diffuse reflection intensity of the light of the light beam that impinges on the optical sheet side of the evaluation sample and undergoes diffuse reflection is measured by scanning with a photodetector at each degree within a range of $-\theta$ degrees to $+\theta$ degrees with respect to the diffuse regular reflection direction.

The angle of 45 degrees in the direction of regular reflection of the incident beam is defined as the diffuse regular reflection direction. The apparatus used to measure the diffuse reflection intensity is not particularly restricted, but a GC5000L by Nippon Denshoku Industries Co., Ltd. was used for the invention.

Control using the following formula (I) as the index is a feature of the invention.

$$0.16 < R/V < 0.71 \tag{I}$$

If R/V is greater than 0.16, it is possible to obtain an optical sheet with excellent vivid complexion and blackness and satisfactory image crispness. From the viewpoint of obtaining even more satisfactory vivid complexion and blackness, R/V is preferably greater than 0.20 and more preferably greater than 0.31.

From the viewpoint of obtaining even more satisfactory image crispness, R/V is more preferably less than 0.62.

The optical sheet of the invention satisfies formula (I) above. An optical sheet satisfying formula (I) above has excellent vivid complexion and blackness and also excellent image crispness.

In order to ensure that 0.16<R/V<0.71 according to the invention, it is essential to adjust the reflective luminance distribution and intensity by the internal diffusion factor and external diffusion factor.

The method for adjusting the reflective luminance distribution and intensity by the internal diffusion factor may be a method in which translucent inorganic particles and/or translucent organic particles (hereunder also referred to simply as "translucent particles") are dispersed in the resin composing the functional layer.

It can also be accomplished by controlling the form of the transparent resin composing the functional layer and the translucent particles dispersed in the transparent resin, the state of dispersion, the particle size, the amount of addition and the refractive index. The concentrations of additives other than the translucent particles added to the transparent resin can also influence the diffuse reflection intensity by the internal diffusion factor.

As examples of methods for adjusting the diffuse reflection intensity by the external diffusion factor there may be mentioned:

(1) a method of using a die with fine concavoconvexities in the surface and transferring the concavoconvex shape to the optical sheet surface,
(2) a method of forming concavoconvexities in the surface by cure shrinkage of the resin composing the functional layer, such as an ionizing radiation curable resin,
(3) a method of protrusion hardening of the translucent fine particles from the surface layer to form concavoconvexities in the surface (either covering the protruding fine particles with the resin composing the surface layer, or causing the fine particles to protrude out), and
(4) a method of forming surface irregularities by external pressure.

As an example of method (1), an ionizing radiation curable resin may be mixed with the transparent base material, and a die having fine concavoconvexities may be bonded to the coating layer of the ionizing radiation curable resin for curing by ionizing radiation, to form a concavoconvex shape on the surface of the optical sheet.

Method (2) can yield fine concavoconvexities with a smooth surface and is therefore effective for glare prevention and prevention of unwanted reflection, while method (3) allows the performance to be adjusted by selection of the translucent particles and transparent resin, the coating film thickness, the solvent, the drying conditions and permeability into the transparent base material, and is therefore a shorter process with simpler operation, which is thus effective for allowing low-cost production.

The functional layer 6 provided between the concavoconvex surface or concavoconvex layer and the transparent base material (an anti-reflection layer, antifouling layer, hard coat layer, antistatic layer or the like) also influences the diffuse reflection intensity by the external diffusion factor. Specifically, by forming another functional layer on the concavoconvex surface to create a two-layer structure, it is possible to moderate the surface irregularities and control the surface diffusion. Incidentally, by increasing the thickness of the coating film of the other functional layer, it is possible to moderate the surface irregularities, and control the surface diffusion by the coating solution composition and the coating and drying conditions as well.

Method (3) for obtaining the external diffusion factor is a suitable method from the viewpoint that it allows external diffusion and internal diffusion to be imparted simultaneously by the type of translucent fine particles used, thereby simplifying the production process.

On the other hand, using a method other than method (3) is preferred because it is possible to design separately and independently a method of adjusting the diffuse reflection intensity by the external diffusion factors and a method of adjusting the diffuse reflection intensity by the internal diffusion factors, and this facilitates adjustment of the optical performance other than contrast, such as resolution, glare and prevention of unwanted reflection.

Furthermore, this allows adjustment of the diffuse reflection intensity by the external diffusion factor, without considering the optical performance of the resin that is used, thus facilitating selection of a resin that exhibits physical performance including surface resin hard coat property, antifouling property and antistatic property.

[Translucent Particles]

The translucent particles 7 dispersed in the transparent resin will now be described in detail.

The translucent particles may be organic particles or inorganic particles, and a mixture of organic particles and inorganic particles may also be used.

The mean particle size of the translucent particles used in the optical sheet of the invention is in the range of preferably 0.5-20 μm and more preferably 1-10 μm. Within this range it is possible to adjust the diffuse reflection intensity distribution by internal diffusion and/or external diffusion.

If the mean particle size of the translucent particles is at least 0.5 μm the aggregation of particles will not be excessive and it will be easy to adjust formation of the concavoconvexities, while if it is no greater than 20 μm, images with glare and shine will be prevented and a greater degree of design freedom will be ensured for the diffuse reflection intensity distribution.

Lower variation in the particle size of the translucent particles will also result in lower variation in the scattering property, thus facilitating design of the diffuse reflection intensity distribution. More specifically, $(d75-d25)/MV$ is preferably no greater than 0.25 and more preferably no greater than 0.20, where MV is the mean diameter based on the weight average, d25 is the cumulative 25% diameter and d75 is the cumulative 75% diameter.

The cumulative 25% diameter is the particle size constituting 25 wt %, counting from the particles with small particle size among the particle size distribution, and the cumulative 75% diameter is the particle size constituting 75 wt %, counting in the same manner.

As an example of adjusting the variation in particle size, the synthesis reaction conditions may be modified, while classification after synthesis reaction is also an effective means. With classification, the frequency may be increased or the degree intensified to obtain particles with the preferred distribution.

The method used for classification is preferably an air classification method, centrifugal classification method, precipitating classification method, filtering classification method, electrostatic classification method or the like.

The difference in refractive index between the transparent resin composing the functional layer and the translucent particles is preferably 0.01-0.25. If the difference in refractive index is at least 0.01 it will be possible to prevent glare, and if it is no greater than 0.25 the diffuse reflection intensity distribution design will be facilitated. From this viewpoint, the difference in refractive index is preferably 0.01-0.2 and more preferably 0.02-0.15.

The refractive index of the translucent particles is measured by measuring the turbidity with dispersion of equal amounts of the translucent particles in solvents with varying refractive indexes, obtained by varying the mixing ratio with two different solvents having different refractive indexes, measuring the refractive index of the solvent at minimum turbidity using an Abbe refractometer, or by using a Cargille reagent.

The diffuse reflection intensity can also be modified by using two different translucent particles with a specific gravity difference of 0.1 or greater, by using two different translucent particles with different particle sizes and a particle size difference of 0.5 µm or greater, by using two different translucent particles with a difference in refractive index of 0.01 or greater, or by using spherical translucent particles and amorphous translucent particles together.

The specific gravity can be measured by liquid phase exchange or gas phase exchange (pycnometer method), the particle size can be measured by the Coulter counter method or optical diffraction scattering method, or by observing the optical laminate cross-section with a microscope such as an SEM or TEM, and the refractive index can be measured by direct measurement with an Abbe refractometer, by a method using a Cargille reagent, or by quantitative evaluation by measurement of the spectral reflection spectrum or spectroscopic ellipsometry.

As translucent organic particles there may be used polymethyl methacrylate particles, polyacrylstyrene copolymer particles, melamine resin particles, polycarbonate particles, polystyrene particles, crosslinked polystyrene particles, polyvinyl chloride particles, benzoguanamine-melamine-formaldehyde particles, silicone particles, fluorine-based resin particles, a polyester-based resin, or the like.

As translucent inorganic particles there may be mentioned silica particles, alumina particles, zirconia particles, titania particles or hollow or porous inorganic particles.

Since even translucent fine particles having the same refractive index and particle size distribution will have a different diffuse reflection intensity distribution depending on the degree of aggregation of the translucent particles, the diffuse reflection intensity distribution can be modified by combining two or more translucent particles with different aggregation states, or using two or more types of inorganic particles with different silane coupling treatment conditions to alter the aggregation state.

In order to prevent aggregation of the translucent particles, it is preferred to employ a method of adding silica with a particle size of no greater than the wavelength of visible light rays, such as a particle size of no greater than about 50 nm.

To obtain an internal diffusion effect, it is effective to use amorphous translucent particles of silica with a particle size of greater than the wavelength of visible light rays. Amorphous particles have an effect of widening the distribution of the reflection diffusion angle compared to spherical particles.

However, since amorphous translucent particles also widen the internal reflective distribution, they can affect the coating film diffusibility and interfere with adjustment of the diffuse reflection intensity, and therefore they are preferably added as necessary, such as when a wide reflection diffusion is desired.

More specifically, amorphous translucent particles are preferably added in a range of less than 4 wt % with respect to the total of the spherical particles and amorphous translucent particles.

The translucent particles are preferably added at 1-30 wt % and more preferably 2-25 wt % in the transparent resin (solid content). An amount of at least 1 wt % can help prevent unwanted reflection, while an amount of no greater than 30 wt % can minimize reduction in contrast and produce satisfactory visibility.

[Transparent Resin]

The transparent resin used to form the functional layer may be an ionizing radiation curable resin or thermosetting resin. For formation of the functional layer, a resin composition comprising the ionizing radiation curable resin or thermosetting resin may be coated onto a transparent base material, and the monomer, oligomer and prepolymer in the resin composition may be crosslinked and/or polymerized.

The functional groups of the monomer, oligomer and prepolymer are preferably ionizing radiation-polymerizable, and are especially photopolymerizable functional groups.

As photopolymerizable functional groups there may be mentioned unsaturated polymerizable functional groups such as (meth)acryloyl, vinyl, styryl and allyl.

As prepolymers and oligomers there may be mentioned acrylates such as urethane(meth)acrylates, polyester(meth)acrylates and epoxy(meth)acrylates, silicon resins such as siloxane, and unsaturated polyesters, epoxy resins and the like.

As monomers there may be mentioned styrene-based monomers such as styrene and α-methylstyrene; acrylic monomers such as methyl(meth)acrylate, 2-ethylhexyl (meth)acrylate, pentaerythritol(meth)acrylate, dipentaerythritol hexa(meth)acrylate, dipentaerythritol penta(meth)acrylate and trimethylolpropane tri(meth)acrylate; and polyol compounds having two or more thiol groups in the molecule, such as trimethylolpropane trithioglycolate, trimethylolpropane trithiopropylate and pentaerythritoltetrathioglycol.

As binders there may be used polymers added to the resin composition. Polymethyl methacrylate (PMMA) is an example of such a polymer. Addition of a polymer allows the viscosity of the coating solution to be adjusted, and this is advantageous in that it can facilitate coating while also facilitating modification of the concavoconvex shape formed by particle aggregation.

A photoradical polymerization initiator may also be added to the resin composition if necessary. As photoradical polymerization initiators there may be used acetophenones, benzoins, benzophenones, phosphine oxides, ketals, anthraquinones, thioxanthones, azo compounds and the like.

As acetophenones there may be mentioned 2,2-dimethoxyacetophenone, 2,2-diethoxyacetophenone, p-dimethylacetophenone, 1-hydroxy-dimethylphenylketone, 1-hydroxy-dimethyl-p-isopropylphenylketone, 1-hydroxycyclohexylphenylketone, 2-methyl-4-methylthio-2-morpholinopropiophenone, 2-benzyl-2-dimethylamino-1-(4-morpholinophenyl)-butanone, 4-phenoxydichloroacetophenone and 4-t-butyl-dichloroacetophenone, and as benzoins there may be mentioned benzoin, benzoinmethyl ether, benzoinethyl ether, benzoinisopropyl ether, benzyldimethylketal, benzoinbenzenesulfonic acid ester, benzointoluenesulfonic acid ester, benzoinmethyl ether, benzoinethyl ether and the like. As benzophenones there may be used benzophenone, hydroxybenzophenone, 4-benzoyl-4'-methyldiphenyl sulfide, 2,4-dichlorobenzophenone, 4,4-dichlorobenzophenone and p-chlorobenzophenone, 4,4'-dimethylaminobenzophenone (Michler's ketone), 3,3',4,4'-tetra(t-butylperoxycarbonyl)benzophenone, and the like.

A photosensitizer may also be used therewith in combination, specific examples of which include n-butylamine, triethylamine and poly-n-butylphosphine.

Using a plurality of phase separable resins as the transparent resin will also allow adjustment of the diffuse reflection intensity by the internal diffusion factor. That is, by using a compatible component and a non-compatible component in admixture for the prepolymer, oligomer, monomer and polymer, it is possible to adjust the diffuse reflection intensity by the internal diffusion factor.

For example, when one resin is a styrene-based resin (polystyrene, styrene-acrylonitrile copolymer or the like), the other resin is preferably a cellulose derivative (cellulose ester such as cellulose acetate propionate or the like), a (meth)acrylic-based resin (polymethyl methacrylate or the like), an alicyclic olefin-based resin (a polymer with norbornane as the monomer, or the like), a polycarbonate-based resin or a polyester-based resin.

When one resin is a cellulose derivative (cellulose ester such as cellulose acetate propionate or the like), the other resin is preferably a styrene-based resin (polystyrene, styrene-acrylonitrile copolymer or the like), a (meth)acrylic-based resin (polymethyl methacrylate or the like), an alicyclic olefin-based resin (a polymer with norbornane as the monomer, or the like), a polycarbonate-based resin or a polyester-based resin.

The ratio of the combined resins (weight ratio) can be selected within the range of 1/99-99/1, preferably the range of 5/95-95/5, more preferably the range of 10/90-90/10, even more preferably the range of 20/80-80/20, and especially the range of 30/70-70/30.

In addition, using a prepolymer, oligomer or monomer with large polymerization shrinkage will allow adjustment of the diffuse reflection intensity by the external diffusion factor. A larger polymerization shrinkage increases the surface irregularities, thus widening the diffuse reflection intensity distribution.

Conversely, addition of a compatible polymer to the ionizing radiation curable resin or thermosetting resin, or addition of fine particles that are no larger than the light wavelength, such as fine particles that are no larger than 100 nm, as a filler can reduce polymerization shrinkage and allow administration of the diffuse reflection intensity by the external diffusion factor.

A solvent will usually be added to the radiation-curing resin composition to adjust the viscosity or to allow dissolution or dispersion of each of the components. The type of solvent used will alter the surface condition of the coating film in the coating and drying steps, and it is therefore selected as appropriate in consideration of allowing adjustment of the reflection intensity distribution by external diffusion. Specifically, it is selected in consideration of the saturation vapor pressure and permeability into the transparent base material.

In the production process of the invention, the resin composition used to form the functional layer preferably contains an ionizing radiation curable resin as the transparent resin, translucent particles, and a solvent.

The resin composition preferably contains a solvent that is impregnated into the transparent base material (hereinafter also referred to as "permeable solvent"), and/or an ionizing radiation curable resin that is impregnated into the transparent base material, and a solvent that is not impregnated into the transparent base material and/or an ionizing radiation curable resin that is not impregnated into the transparent base material.

By adjusting the amount of impregnation into the transparent base material it is possible to control the thickness of the functional layer, and thus allow modification of the diffuse reflection intensity.

More particularly, the diffuse reflection intensity can be controlled by the amount of impregnation into the transparent base material and the sizes of the translucent particles. Specifically, when the amount of impregnation of the solvent and/or ionizing radiation curable resin (hereinafter also referred to simply as "solvent mixture") into the base material is low and the translucent particle sizes are small, a functional layer is formed with the majority of the particles embedded in the solvent mixture, but since the translucent particles tend to aggregate, the surface irregularities are relatively large.

On the other hand, when using a combination of a solvent mixture with a large amount of impregnation into the transparent base material and translucent particles with small particle sizes, aggregation of the translucent particles is reduced and the surface irregularities are relatively small.

When using a combination of a solvent and/or ionizing radiation curable resin with a large amount of impregnation into the transparent base material and translucent particles with large particle sizes, the thickness of the functional layer is reduced, resulting in protrusion of the translucent particles out from the functional layer, forming surface irregularities due to the translucent particles.

In contrast, when using a combination of a solvent mixture with a small amount of impregnation into the transparent base material and translucent particles with large particle sizes, the thickness of the functional layer is increased, thus inhibiting protrusion of the translucent particle into the surface and resulting in relatively small surface irregularities.

By thus adjusting the amount of impregnation of the solvent and/or ionizing radiation curable resin into the transparent base material and effecting control by combination with different particle sizes of translucent particles, it is possible to form surface irregularity shapes of various sizes.

This method is particularly effective when the transparent base material is a cellulose-based resin.

Furthermore, a single type of solvent may be used, or two or more different solvents with different boiling points and/or relative evaporation rates at ordinary temperature/ordinary pressure may be included. By using two or more different solvents, it is possible to achieve a wide range of control of the solvent drying speed.

A high drying speed results in volatilization, and thus less solvent and higher viscosity, before aggregation of the particles has occurred, such that no further aggregation takes place. Thus, control of the drying speed accomplishes control of the translucent particle sizes, and as explained above, it is linked with control of the diffuse reflection intensity by the relationship with the degree of penetration of the solvent and/or ionizing radiation curable resin into the base material.

The relative evaporation rate is the speed calculated by the following formula according to ASTM-D3539, with a larger value representing faster evaporation. Relative evaporation rate=time required for evaporation of n-butyl acetate/time required for evaporation of solvent.

The specific solvent may be appropriately selected in consideration of the aforementioned explanation, and specifically there may be mentioned aromatic solvents such as toluene and xylene, and ketones such as methyl ethyl ketone (MEK), methyl isobutyl ketone (MIBK) and cyclohexanone.

Any of these may be used alone or in combinations of two or more. It is preferred to use a mixture of at least one type of aromatic solvent and at least one type of ketone.

To control the drying speed, there may be combined therewith a cellosolve such as methylcellosolve or ethylcellosolve, a cellosolve acetate, or an alcohol such as ethanol, isopropanol, butanol or cyclohexanol.

Additives other than translucent particles may also be added to the transparent resin in the optical sheet of the invention, as necessary. For example, various inorganic particles may be added to improve the optical characteristics, including the physical properties such as hardness, and the reflectance and scattering property.

As inorganic particles there may be mentioned metals such as zirconium, titanium, aluminum, indium, zinc, tin and antimony, and metal oxides such as $ZrO_2$, $TiO_2$, $Al_2O_3$, $In_2O_3$, ZnO, $SnO_2$, $Sb_2O_3$, ITO, ATO or $SiO_2$. Also included are carbon, MgF, silicon, $BaSO_4$, $CaCO_3$, talc, kaolin and the like.

The particle sizes of the inorganic particles are preferably as micronized as possible in the resin composition during coating of the functional layer, in order to minimize the effect on the diffuse reflection intensity distribution, and the mean particle size is preferably in a range of no greater than 100 nm.

By micronizing the inorganic particles to no greater than 100 nm, it is possible to form an optical sheet that does not impair the transparency. The particle sizes of the inorganic particles can be measured by the light scattering method or using an electron microscope photograph.

According to the invention, various surfactants may be used for an anti-aggregation effect and anti-settling effect, as well as to improve the properties such as the leveling property. As surfactants there may be mentioned silicone oils, fluorine-based surfactants, and fluorine-based surfactants preferably containing perfluoroalkyl groups.

When the resin composition containing the solvent is coated and dried, a difference in surface tension is produced between the membrane surface and the inner surface in the coated film, whereby multiple convection currents are created within the film. The convection currents result in orange peel surface and coating defects.

This also adversely affects the vivid complexion and blackness and image crispness. When such a surfactant is used it is possible to prevent such convection currents, thus resulting not only in a concavoconvex film without defects or irregularities, but also facilitating adjustment of the diffuse reflection intensity property.

According to the invention there may also be added stainproofing agents, antistatic agents, coloring agents (pigments and dyes), flame retardants, ultraviolet absorbers, infrared absorbers, tackifiers, polymerization inhibitors, antioxidants, surface modifiers and the like.

The transparent base material used in the optical sheet of the invention is not particularly restricted so long as it is commonly used in optical sheets, and it may be a transparent resin film, transparent resin plate, transparent resin sheet, transparent glass or the like.

As transparent resin films there may be used triacetylcellulose films (TAC films), diacetylcellulose films, acetylbutylcellulose films, acetylpropylcellulose films, cyclic polyolefin films, polyethylene terephthalate films, polyethersulfone films, polyacrylic-based resin films, polyurethane-based resin films, polyester films, polycarbonate films, polysulfone films, polyether films, polymethylpentene films, polyetherketone films, (meth)acrylonitrile films, polynorbornane-based resin films and the like.

In particular, a TAC film or cyclic polyolefin film is preferred when the optical sheet of the invention is to be used together with a polarizing plate, since these do not interfere with polarized light, and a polyester film such as a polyethylene terephthalate film is preferred if emphasis is on mechanical strength and smoothness.

The transparent base material may be a multilayer or monolayer material, and a primer layer may also be provided on the surface for adhesion with the coating film.

In order to prevent interference patterns produced at the interface when a substantial difference in refractive index exists between the transparent base material and coating film layer, an anti-interference pattern layer with a refractive index intermediate between the transparent base and coating film layer may be provided between them, or concavoconvexities of about 0.3-1.5 μm may be formed as surface roughness (ten-point height of irregularities: Rz). The Rz value is measured according to JIS B0601 1994.

Functions such as a hard coat property, prevention of unwanted reflection, anti-reflection, an antistatic property or an antifouling property may be imparted to the optical sheet of the invention.

The hard coat property is usually evaluated based on the pencil hardness (measured according to JIS K5400), or by a 10-pass abrasion test using steel wool #0000 under a load, evaluating the maximum load under which no damage is observed with black tape attached to the back side (steel wool scuff resistance).

The pencil hardness of the optical sheet of the invention is preferably H or greater, and more preferably 2H or greater. The steel wool scuff resistance is preferably 200 $g/cm^2$ or greater, more preferably 500 $g/cm^2$ or greater and even more preferably 700 $g/cm^2$ or greater.

For anti-reflection, a low refractive index layer is provided on the outer surface to reduce the reflectance of the sheet. The refractive index of the low refractive index layer is preferably no greater than 1.5 and more preferably no greater than 1.45.

The low refractive index layer is formed of a material containing silica or magnesium fluoride, or a fluorine resin as a low refractive index resin.

The thickness d of the low refractive index layer preferably satisfies $d=m\lambda/4n$. Here, m represents a positive odd number, n represents the refractive index of the low refractive index layer, and λ represents the wavelength. The value of m is preferably 1, and λ is preferably 480-580 nm. From the viewpoint of low reflectance, the relationship $120<n\cdot d<145$ is preferably satisfied.

Antistatic performance is preferably imparted from the viewpoint of preventing static electricity on the optical sheet surface.

To impart antistatic performance, there may be mentioned methods known in the prior art, such as a method of coating a conductive coating solution comprising conductive fine particles, a conductive polymer, a quaternary ammonium salt, thiophene or the like and a reactive curing resin, or a method of forming a conductive thin-film by vapor deposition or sputtering of a metal or metal oxide that forms a transparent film.

The antistatic layer may also be used as a portion of a functional layer, such as for hard coating, prevention of unwanted reflection, anti-reflection or the like.

The surface resistance value is an index of the antistatic property, and according to the invention the surface resistance value is preferably no greater than $10^{12}$ Ω/sq., more preferably no greater than $10^{11}$ Ω/sq. and especially no greater than $10^{10}$ Ω/sq. The "saturated electrostatic voltage", or the maximum voltage at which the optical film can accumulate, is preferably no greater than 2 kV at an applied voltage of 10 kV.

An antifouling layer may also be provided on the outer surface of the optical sheet of the invention. An antifouling layer lowers the surface energy and inhibits adhesion of hydrophilic or lipophilic contaminants.

The antifouling layer can be imparted by adding a stain-proofing agent, and as stain-proofing agents there may be mentioned fluorine-based compounds, silicon-based compounds and their mixtures, among which fluoroalkyl group-containing compounds are particularly preferred.

A method for producing an optical sheet of the invention will now be explained in detail. According to the invention, it is essential to control the production conditions so that the formula $0.16 < R/V < 0.71$ as an index is satisfied, as mentioned above.

The optical sheet of the invention is produced by coating a resin composition that is to form the functional layer on a transparent base material. The coating method may be any of various known methods, such as dip coating, air knife coating, curtain coating, roll coating, wire bar coating, gravure coating, die coating, blade coating, microgravure coating, spray coating, spin coating, for example.

According to the invention, the reflection diffusion luminance property changes by the coating amount, and therefore roll coating, gravure coating or die coating is preferred since they allow a functional layer thickness to be stably obtained in the range of 1-20 μm.

After coating by any of the aforementioned methods, the sheet is transported into a heated zone to dry the solvent, or another known method is used to dry the solvent.

By selecting the relative evaporation rate of the solvent, the solid concentration, the coating solution temperature, the drying temperature, the drying air speed, the drying time and the dry zone solvent atmosphere concentration, it is possible to adjust the external diffusion due to the profile of the surface irregularity shapes, and the internal diffusion due to the translucent particles or additives.

A method of adjusting the reflection diffusion luminance property by selection of the drying conditions is particularly preferred and convenient. Specifically, the drying temperature is preferably 30-120° C. and the drying wind speed 0.2-50 m/s, as the reflection diffusion luminance property can be controlled with appropriate adjustment in this range.

More specifically, increasing the drying temperature increases the permeability of the resin and solvent into the base material. That is, by controlling the drying temperature it is possible to control the permeability of the resin and solvent into the base material, and as explained above, this is linked with control of the diffuse reflection intensity by the relationship between the translucent particles and particle sizes.

For example, when the resin composition used to form the functional layer comprises a transparent resin, translucent particles having a higher refractive index than the transparent resin, and a solvent, the refractive index of the permeable component in the transparent resin is lower than the refractive index of the translucent particles, the leveling property and settling and aggregation of the translucent particles are on the same level, and a longer drying time until curing results in permeation of the low refraction components in the transparent resin into the transparent base material, a higher refractive index of the transparent resin, and a lower difference in refractive index with the translucent particles.

On the other hand, since the proportion of the translucent particles with respect to the transparent resin increases, the translucent particles tend to protrude out from the surface, so that surface irregularities readily form. Thus, a longer drying time reduces the internal diffusion while simultaneously increasing the external diffusion.

Incidentally, this permeability can be utilized for adhesiveness between the transparent base material and functional layer by an anchor effect, or to prevent generation of interference patterns that become notable when the difference in refractive index between the transparent base material and functional layer is 0.03 or greater.

This permeation layer that is produced by permeation of the low refraction component in the transparent resin into the transparent base material exhibits a function as a refractive index-modifying layer wherein the refractive index between the transparent base material and functional layer varies continuously.

Also, by increasing the drying speed, the aggregation time of the translucent particles is shortened so that aggregation is impeded, thus exhibiting the same effect as an actual reduction in the particle size of the translucent particles.

That is, by controlling the drying speed it is possible to control the sizes of the translucent particles that are used, and as explained above, this is linked with control of the diffuse reflection intensity by the relationship with the degree of penetration of the solvent and/or ionizing radiation curable resin into the base material.

Examples

The present invention will now be explained in greater detail by examples, with the understanding that the invention is in no way limited by the examples.

(Evaluation Method)
1. Measurement of Diffuse Regular Reflection Intensity and Diffuse Reflection Intensity This was measured for each of the optical sheets fabricated in the production examples, by the methods described throughout the present specification.

2. Evaluation of Vivid Complexion and Blackness and Image Crispness

The polarizing plate on the outer surface of a KDL-40X2500 liquid crystal television by Sony Corporation was released and a polarizing plate without surface coating was attached.

Next, a sample produced by each production example was attached thereover with the surface-coated side as the outer surface, using a transparent pressure-sensitive adhesive film for an optical film (product with total light transmittance: $\geq 91\%$, haze: $\leq 0.3\%$, film thickness: 20-50 μm, such as one of the MHM Series by Nichiei Kakoh Co., Ltd.).

The liquid crystal television was set in a room in an environment with an illuminance of about 1,000 Lx, the DVD "Phantom of the Opera" by Media Factory, Inc. was displayed thereon, and the image was viewed by 15 subjects from a location about 1.5-2.0 m distant from the liquid crystal television, for sensation evaluation of the following properties, each on a 3-level scale. The evaluation criteria were as follows, with the most frequent evaluation result recorded as the final result.

(1) Vivid complexion and blackness (for display of dynamic images): Judgment of high contrast, gloss and brightness in the image, and feeling of motion.
G: Evaluation of "satisfactory" by at least 10 individuals.
F: Evaluation of "satisfactory" by 5-9 individuals.
P: Evaluation of "satisfactory" by 4 or fewer individuals.

(2) Image crispness (for still images): Judgment of high contrast, excellent prevention of unwanted reflection (a condition without disturbance by virtual images of observer or observer background), and visibility of still image.
G: Evaluation of "satisfactory" by at least 10 individuals.
F: Evaluation of "satisfactory" by 5-9 individuals.
P: Evaluation of "satisfactory" by 4 or fewer individuals.

Production Example 1

Triacetylcellulose (80 μm thickness, FujiFilm Corp.) was prepared as a transparent base material.

The transparent resin used was a mixture of pentaerythritol triacrylate (PETA), dipentaerythritol hexaacrylate (DPHA) and polymethyl methacrylate (PMMA) (weight ratio: PETA/DPHA/PMMA=86/5/9) (refractive index: 1.51), and polystyrene particles (refractive index: 1.60, mean particle size: 3.5 μm, (d75−d25)/MV=0.05) and styrene-acrylic copolymer particles (refractive index: 1.56, mean particle size: 3.5 μm, (d75−d25)/MV=0.04) were added thereto as translucent particles, at 18.5 and 3.5 parts by weight, respectively, with respect to 100 parts by weight of the transparent resin.

A resin composition obtained by mixing a mixed solvent of toluene (boiling point: 110° C., relative evaporation rate: 2.0) and cyclohexanone (boiling point: 156° C., relative evaporation rate: 0.32) (weight ratio: 7:3) as the solvent at 190 parts by weight with respect to 100 parts by weight of the transparent resin, was coated onto the transparent base material and dry air at 70° C. was circulated at a flow rate of 0.2 m/s for 1 minute of drying.

Next, it was irradiated with ultraviolet rays (200 mJ/cm$^2$ under a nitrogen atmosphere) to cure the transparent resin, to fabricate an optical sheet. The coating film thickness was 3.5 μm. The results of evaluating the optical sheet by the methods described above are shown in Table 2.

Production Examples 2-7 and Production Examples 10-19

An optical sheet was fabricated for Production Example 1, changing the type of transparent base material, the type of transparent resin, the types and content of translucent particles, the type and content of the solvent, the drying conditions and the coating film thickness, as listed in Table 1. The results of evaluating each optical sheet in the same manner as Production Example 1 are shown in Table 2.

Production Example 8

Triacetylcellulose (80 μm thickness, FujiFilm Corp.) was prepared as a transparent base material.

Pentaerythritol triacrylate (PETA, refractive index: 1.51) was used as the transparent resin, and there were added thereto as translucent particles, styrene-acrylic copolymer particles (refractive index: 1.51, mean particle size: 9.0 μm, (d75−d25)/MV=0.04) and polystyrene particles (refractive index: 1.60, mean particle size: 3.5 μm, (d75−d25)/MV=0.05), at 10.0 parts by weight and 16.5 parts by weight, respectively, with respect to 100 parts by weight of the transparent resin.

A resin composition obtained by mixing a mixed solvent of toluene (boiling point: 110° C., relative evaporation rate: 2.0) and cyclohexanone (boiling point: 156° C., relative evaporation rate: 0.32) (weight ratio: 7:3) as the solvent at 190 parts by weight with respect to 100 parts by weight of the transparent resin, was coated onto the transparent base material and dry air at 85° C. was circulated at a flow rate of 1 m/s for 1 minute of drying.

This was irradiated with ultraviolet rays (100 mJ/cm$^2$ under an air atmosphere) to cure the transparent resin.

A resin composition obtained by mixing PETA (pentaerythritol triacrylate, refractive index: 1.51) as the transparent resin and a mixed solvent of toluene (boiling point: 110° C., relative evaporation rate: 2.0) and cyclohexanone (boiling point: 156° C., relative evaporation rate: 0.32) (weight ratio: 7:3) as the solvent at 190 parts by weight with respect to 100 parts by weight of the transparent resin, was coated onto the coating film layer, and dry air at 70° C. was circulated at a flow rate of 5 m/s for 1 minute of drying (hard coat layer formation).

This was irradiated with ultraviolet rays (200 mJ/cm$^2$ under a nitrogen atmosphere) to cure the transparent resin, to fabricate an optical sheet. The total coating film thickness was 12.0 μm. The results of evaluating the optical sheet in the same manner as Production Example 1 are shown in Table 2.

Production Example 9

An optical sheet was fabricated for Production Example 8 in the same manner as Production Example 8, except that the content of the polystyrene particles as the translucent particles was 6.5 parts by weight with respect to 100 parts by weight of the transparent resin, and the total coating film thickness was 13.0 μm. The results of evaluation in the same manner as Production Example 1 are shown in Table 2.

TABLE 1

| Production Example | Transparent base Type | Transparent resin Type | Translucent particles Type | | Content | | Solvent Type | Content | Drying conditions Temp. (° C.) | Wind speed (m/s) | Time (min) | Coated film thickness (μm) |
|---|---|---|---|---|---|---|---|---|---|---|---|---|
| 1 | TAC | P | A | B | 18.5 | 3.5 | Y | 190 | 70 | 0.2 | 1 | 3.5 |
| 2 | TAC | P | A | — | 16 | — | Y | 190 | 70 | 1 | 1 | 3.5 |
| 3 | TAC | P | B | — | 9 | — | Y | 190 | 70 | 2 | 1 | 5.5 |
| 4 | TAC | Q | C | — | 12 | — | Y | 150 | 80 | 15 | 0.5 | 8.5 |
| 5 | TAC | Q | E | — | 8 | — | X | 190 | 70 | 10 | 0.5 | 2.0 |
| 6 | TAC | P | A | — | 16 | — | Y | 190 | 55 | 1 | 1 | 3.5 |
| 7 | TAC | P | A | B | 16.5 | 2 | Y | 190 | 55 | 5 | 1 | 4.0 |
| 8 | TAC | Q/Q | C | A | 10 | 16.5 | Y/Y | 190/190 | 85/70 | 1/5 | 1/1 | 12.0 |
| 9 | TAC | Q/Q | C | A | 10 | 6.5 | Y/Y | 190/190 | 85/70 | 1/5 | 1/1 | 13.0 |
| 10 | TAC | Q | E | D | 1 | 5 | X | 190 | 60 | 10 | 0.5 | 2.5 |
| 11 | TAC | P | A | — | 16 | — | Y | 190 | 70 | 0.5 | 1 | 3.0 |
| 12 | TAC | P | A | B | 12.5 | 2 | Y | 150 | 100 | 25 | 0.5 | 4.0 |
| 13 | TAC | Q | E | D | 4 | 4 | X | 190 | 70 | 10 | 0.5 | 2.0 |
| 14 | TAC | Q | E | — | 9 | — | X | 190 | 70 | 10 | 0.5 | 2.0 |
| 15 | TAC | Q | D | E | 3.5 | 0.5 | X | 150 | 80 | 20 | 0.5 | 2.5 |
| 16 | PET | Q | E | — | 2 | — | X | 150 | 80 | 20 | 0.5 | 4.0 |

TABLE 1-continued

| Production Example | Transparent base Type | Transparent resin Type | Translucent particles Type | Translucent particles Content | Solvent Type | Solvent Content | Drying conditions Temp. (°C.) | Drying conditions Wind speed (m/s) | Drying conditions Time (min) | Coated film thickness (μm) |
|---|---|---|---|---|---|---|---|---|---|---|
| 17 | PET | Q | D | 1 | X | — | 190 | 70 | 5 | 1 | 4.5 |
| 18 | TAC | Q | E | 3 | X | — | 150 | 50 | 50 | 0.5 | 5.0 |
| 19 | TAC | Q | — | — | X | — | 190 | 70 | 10 | 0.5 | 10.0 |

A: Polystyrene particles (refractive index: 1.60, mean particle size: 3.5 μm, (d75 − d25)/MV = 0.05)
B: Styrene-acrylic copolymer particles (refractive index: 1.56, mean particle size: 3.5 μm, (d75 − d25)/MV = 0.04)
C: Styrene-acrylic copolymer particles (refractive index: 1.51, mean particle size: 9.0 μm, (d75 − d25)/MV = 0.04)
D: Amorphous silica (refractive index: 1.45, mean particle size: 1.5 μm, (d75 − d25)/MV = 0.6)
E: Amorphous silica (refractive index: 1.45, mean particle Size: 2.5 μm, (d75 − d25)/MV = 0.8)
P: Mixture of pentaerythritol triacrylate (PETA), dipentaerythritol hexaacrylate (DPHA) and polymethyl methacrylate (PMMA) (weight ratio: PETA/DPHA/PMMA = 86/5/9) (refractive index: 1.51)
Q: Pentaerythritol triacrylate (PETA) (refractive index: 1.51)
X: Mixture of toluene (boiling point: 110° C., relative evaporation rate: 2.0) and methyl isobutyl ketone (boiling point: 116° C., relative evaporation rate: 1.6) (weight ratio: 8:2)
Y: Mixture of toluene (boiling point: 110° C., relative evaporation rate: 2.0) and cyclohexanone (boiling point: 156° C., relative evaporation rate: 0.32) (weight ratio: 7:3)

TABLE 2

| Production Example | R | V | R/V | Vivid complexion and blackness | Image crispness | Total haze | Interior haze | Interior/total haze (%) |
|---|---|---|---|---|---|---|---|---|
| 1 | 1893 | 9984 | 0.190 | F | F | 40.6 | 29.2 | 71.9 |
| 2 | 1804 | 9983 | 0.181 | F | F | 38.5 | 27.7 | 71.9 |
| 3 | 6325 | 15956 | 0.396 | G | G | 10.5 | 7.9 | 75.2 |
| 4 | 2873 | 14214 | 0.202 | F | G | 2.5 | 1.6 | 64.0 |
| 5 | 453 | 4993 | 0.091 | P | G | 23.5 | 1.9 | 8.1 |
| 6 | 992 | 8438 | 0.118 | P | F | 41.0 | 29.7 | 72.4 |
| 7 | 1021 | 8278 | 0.123 | P | F | 44.6 | 32.7 | 73.3 |
| 8 | 17275 | 26675 | 0.648 | G | F | 33.6 | 33.1 | 98.5 |
| 9 | 14990 | 25987 | 0.577 | G | G | 17.4 | 16.9 | 97.1 |
| 10 | 6379 | 17899 | 0.356 | G | G | 2.2 | 1.3 | 59.1 |
| 11 | 3000 | 13070 | 0.229 | F | F | 37.9 | 28.1 | 74.1 |
| 12 | 1684 | 9153 | 0.184 | F | F | 42.0 | 34.4 | 81.9 |
| 13 | 1223 | 8218 | 0.149 | P | G | 10.3 | 2.1 | 20.4 |
| 14 | 438 | 4976 | 0.088 | P | G | 23.0 | 2.8 | 12.2 |
| 15 | 3763 | 14108 | 0.267 | F | G | 3.6 | 2.8 | 77.8 |
| 16 | 2460 | 12467 | 0.197 | F | G | 5.6 | 4.8 | 85.7 |
| 17 | 20805 | 27195 | 0.765 | G | P | 1.3 | 0.0 | 0.0 |
| 18 | 6379 | 17710 | 0.360 | G | G | 3.4 | 3.1 | 91.2 |
| 19 | 35023 | 35023 | 1.000 | G | P | — | — | — |

For Production Examples 1-19, R/V was calculated from the measurement results for the diffuse reflection intensity. An optical sheet satisfying formula (I) above has satisfactory vivid complexion and blackness and satisfactory image crispness, and a good balance between them.

According to the invention, Production Examples 1-4, 8-12, 15, 16 and 18 correspond to examples that satisfy 0.16<R/V<0.71, and Production Examples 5-7, 13, 14, 17 and 19 correspond to examples that do not satisfy the formula.

With the optical sheet of the invention it is possible to conveniently evaluate vivid complexion and blackness, and image crispness, which have not been evaluable by the conventional haze value, to thus stably provide an optical sheet with excellent vivid complexion and blackness and excellent image crispness.

The invention claimed is:

1. An optical sheet for use as a display device surface, the optical sheet comprising:
   a transparent base material; and
   a functional layer having an outer surface and an interior, and being on at least one side of the transparent base material,
   wherein the optical sheet has a diffusion factor on at least one of the outer surface and the interior of the functional layer, wherein the relationship represented by the following formula (I) is satisfied:

$$0.16 < R/V < 0.71 \qquad (I)$$

R (diffuse regular reflection intensity): Intensity in the direction of diffuse regular reflection
V: Sum of diffuse reflection intensities measured for each degree between $-\theta$ degrees and $+\theta$ degrees with respect to the direction of diffuse regular reflection when the optical sheet is irradiated with visible light rays.

2. An optical sheet according to claim 1, wherein the following formula (II) is satisfied.

$$0.20 < R/V < 0.62 \qquad (II).$$

3. An optical sheet according to claim 1, wherein the following formula (III) is satisfied.

$$0.31 < R/V < 0.62 \qquad (III).$$

4. An optical sheet according to claim 1, wherein the display device is a liquid crystal display unit.

5. An optical sheet according to claim 4, wherein the functional layer comprises at least one of translucent inorganic particles and translucent organic particles dispersed in a transparent resin, and concavoconvexities are disposed on the surface of the functional layer by the at least one of translucent inorganic particles and translucent organic particles.

6. An optical sheet according to claim 4, wherein the transparent base material is a cellulose-based resin, the functional layer comprises a transparent resin, the transparent resin is an ionizing radiation curable resin, the functional layer is formed by coating an ionizing radiation curable resin composition comprising the ionizing radiation curable resin on the transparent base material and subjecting ionizing radiation curable resin composition to crosslinking curing, the ionizing radiation curable resin composition comprises at least one of a solvent that is impregnated into the transparent base material and an ionizing radiation curable resin that is impregnated into the transparent base material, and at least one of a solvent that is not impregnated into the transparent base material and an ionizing radiation curable resin that is not impregnated into the transparent base material, and the degree of impregnation into the transparent base material is adjusted for control so that the relationship of formula (I), formula (II) or formula (III) is satisfied.

7. An optical sheet according to claim 4, wherein the transparent base material is triacetylcellulose or a cyclic polyolefin.

8. An optical sheet according to claim 4, wherein the transparent base material is polyethylene terephthalate.

9. An optical sheet according to claim 4, wherein the functional layer comprises a hard coat layer, and the steel wool scuff resistance is at least 200 g/cm$^2$.

10. An optical sheet according to claim 4, further comprising an anti-reflection functional layer disposed on an uppermost surface layer.

11. A polarizing plate employing an optical sheet according to claim 1.

12. An image display device employing a polarizing plate according to claim 11.

13. A method for improving vivid complexion and blackness and image crispness in an image display device which is suitable for a combination of dynamic images and still images, wherein the image display device has an optical sheet on a surface thereof,
the optical sheet has a functional layer disposed on at least one side of a transparent base material,
the functional layer comprises a diffusion factor on an outer surface thereof and/or interior thereof, and
R/V of the optical sheet has the relationship represented by the following formula (I):

$$0.16 < R/V < 0.71 \qquad (I)$$

R (diffuse regular reflection intensity): Intensity in the direction of the diffuse regular reflection
V: Sum of the diffuse reflection intensities measured for each degree between $-\theta$ degrees and $+\theta$ degrees with respect to the direction of diffuse regular reflection when the optical sheet is irradiated with visible light rays, said method comprising:
irradiating the image display device with visible light rays.

* * * * *

UNITED STATES PATENT AND TRADEMARK OFFICE
CERTIFICATE OF CORRECTION

| | | |
|---|---|---|
| PATENT NO. | : 8,422,135 B2 | Page 1 of 1 |
| APPLICATION NO. | : 12/811134 | |
| DATED | : April 16, 2013 | |
| INVENTOR(S) | : Kodama et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 388 days.

Signed and Sealed this
Twenty-first Day of April, 2015

Michelle K. Lee
*Director of the United States Patent and Trademark Office*